United States Patent
Kunishige et al.

(10) Patent No.: US 6,256,056 B1
(45) Date of Patent: *Jul. 3, 2001

(54) IMAGE INPUT APPARATUS WHICH CONTROLS CHARGE ACCUMULATION OF LINE SENSOR IN ASSOCIATION WITH INTERMITTENT SCAN MOTION OF SCANNING MEANS

(75) Inventors: Keiji Kunishige, Hachioji; Shinichi Kodama, Hino, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,910

(22) Filed: Nov. 6, 1997

(30) Foreign Application Priority Data

Nov. 29, 1996 (JP) ....................................... 8-320377

(51) Int. Cl.[7] .............................. H04N 5/253; H04N 9/47
(52) U.S. Cl. .............................. 348/96; 348/97; 348/102
(58) Field of Search .................... 348/96, 97, 102, 348/105, 107; 358/408–413, 287, 401, 497; 347/257; 318/696; H04N 5/253, 9/47

(56) References Cited

U.S. PATENT DOCUMENTS

| 4,447,830 | * | 5/1984 | Stoffel ................................. 358/283 |
| 4,679,095 | * | 7/1987 | Kitamura et al. .................... 358/515 |
| 4,720,744 | * | 1/1988 | Washi et al. ......................... 358/141 |
| 4,833,544 | * | 5/1989 | Sato et al. ............................ 358/287 |
| 5,059,883 | * | 10/1991 | Takahashi ............................ 318/696 |
| 5,096,295 | * | 3/1992 | Krupa et al. ......................... 356/334 |
| 5,111,044 | * | 5/1992 | Agano .................................. 250/584 |
| 5,170,254 | * | 12/1992 | Mead .................................... 358/214 |
| 5,220,436 | * | 6/1993 | Aosaki et al. ....................... 358/401 |
| 5,363,217 | * | 11/1994 | Keightley ............................ 358/506 |
| 5,451,949 | | 9/1995 | Gundry . |
| 5,548,327 | * | 8/1996 | Gunday et al. ....................... 348/97 |
| 5,570,206 | * | 10/1996 | Yoshinaga ............................ 358/497 |
| 5,644,356 | * | 7/1997 | Swinson et al. ...................... 348/96 |
| 5,742,326 | * | 4/1998 | Matsui et al. ....................... 347/257 |
| 5,768,444 | * | 6/1998 | Nishimura ............................ 382/298 |

FOREIGN PATENT DOCUMENTS 52-37776    9/1977   (JP) .

OTHER PUBLICATIONS

Patent Abstracts of Japan, No. 7–143396 dated Jun. 2, 1995.
Patent Abstracts of Japan, No. 7–184002 dated Jul. 21, 1995.

* cited by examiner

Primary Examiner—Howard Britton
Assistant Examiner—Nhon T Diep
(74) Attorney, Agent, or Firm—Frishauf, Holtz, Goodman, Langer & Chick, P.C.

(57) ABSTRACT

An image input apparatus is provided with an imaging section, a scanner, and a charge accumulation control section. The imaging section includes a line sensor and converts an image recorded on film into electric signals. The scanner mechanically scans the relative positional relationships between the film and the line sensor in an intermittent fashion. The charge accumulation control section controls the timings at which the line sensor starts a charge accumulation operation, and this control is executed in association with the intermittent scanning operation of the scanner.

3 Claims, 9 Drawing Sheets

FIG. 10B INTEGRATION

FIG. 10C DATA TRANSFER

FIG. 10D

FIG. 10E { INTEGRATION

DATA TRANSFER

IMAGE INPUT APPARATUS WHICH CONTROLS CHARGE ACCUMULATION OF LINE SENSOR IN ASSOCIATION WITH INTERMITTENT SCAN MOTION OF SCANNING MEANS

BACKGROUND OF THE INVENTION

The present invention relates to an image input apparatus, and more particularly to an image input apparatus which inputs an image while simultaneously moving film and imaging means relative to each other.

Jpn. Pat. Appln. KOKAI Publications No. 07-143396 and No. 07-184002 relate to image input apparatuses. The former publication is directed to a method of moving film and determining the time at which an integrating operation is performed for image detection. To be more specific, the publication discloses a technique for performing an integrating operation while continuously moving film at constant speed. The latter publication discloses a technique for performing an integrating operation while continuously moving a detecting system at constant speed.

However, in a case where film is driven at constant speed, the control operation required for maintaining the constant film speed is inevitably complex, since the roll of film thickens each time the film is wound. In addition, in a case where either the detecting system or film is driven at constant speed, it may be hard to perform accurate positional control repeatedly. In addition, if images that are input in succession differ in resolution, the speed control is very complex.

BRIEF SUMMARY OF THE INVENTION

Accordingly, an object of the present invention is to provide an image input apparatus which is capable of performing accurate positional control repeatedly and which produces images of high quality.

Another object of the present invention is to provide an image input apparatus capable of producing high-quality images corresponding to a desired resolution.

To achieve these objects, the present invention provides an image input apparatus comprising:

imaging means, including a charge accumulation type line sensor, for converting an image printed on film into electric signals;

scanning means for mechanically scanning a relative positional relationship between the film and the line sensor in an intermittent fashion; and charge accumulation control means for controlling start time at which charge accumulation by the line sensor is started, in association with an intermittent scanning operation of the scanning means.

The present invention also provides an image input apparatus comprising:

imaging means, including a line sensor, for converting an image recorded on film into electric signals;

scanning means for mechanically scanning a relative positional relationship between the film and the line sensor in an intermittent fashion;

resolution setting means for setting a resolution with respect to an image to be input, when the imaging means converts the image into the electric signals; and scan control means for varying the scanning speed of the scanning means in accordance with the resolution set by the resolution setting means.

The present invention further provides an image input apparatus comprising:

imaging means, including a charge accumulation type line sensor, for converting a film image into electric signals;

driving means for mechanically changing a relative positional relationship between the imaging means and film in a stepwise fashion;

charge accumulation control means for controlling the line sensor to perform charge accumulation when the driving means is in operation; and charge transfer means for transferring a charge signal obtained by the charge accumulation controlled by the charge accumulation control means, when the driving means is at rest.

Moreover, the present invention provides an image input apparatus comprising:

an imaging mechanism, including a line sensor, for converting an image recorded on film into electric signals;

a scanning mechanism for mechanically scanning a relative positional relationship between the film and the line sensor in an intermittent fashion;

a trimming setting mechanism for setting a trimming position of an image to be input, before the imaging mechanism converts the image into the electric signals; and a scanning control mechanism for driving the scanning mechanism to the trimming position set by the trimming setting mechanism; and a charge accumulation control mechanism for controlling the start time at which the line sensor starts charge accumulation, in association with an intermittent scanning operation of the scanning mechanism.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described in detail with reference to the accompanying drawings.

Figure 1:
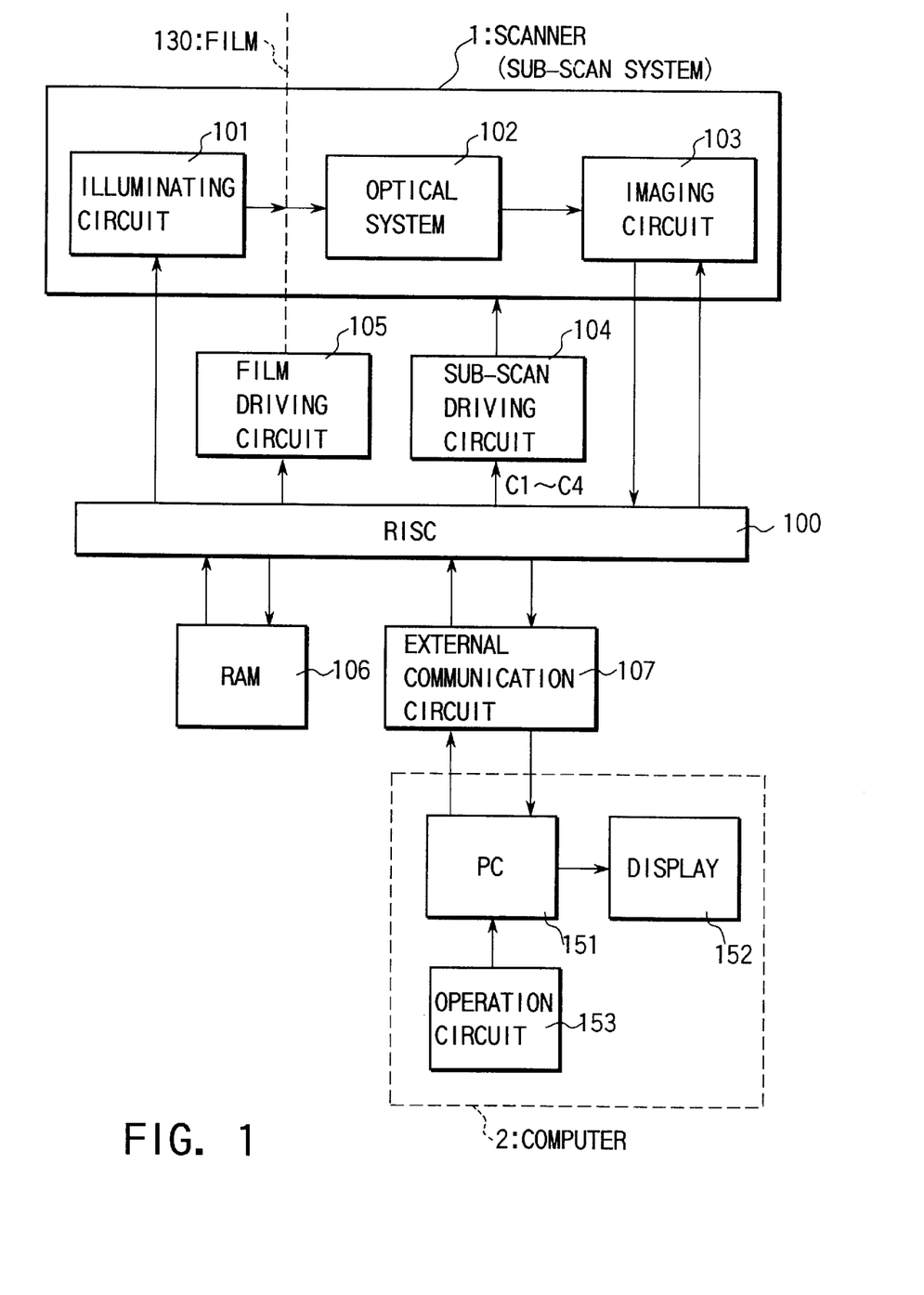
FIG. 1 shows an image input system to which the present invention is applied.

FIG. 1 shows an image input system to which the present invention is applied. Referring to FIG. 1, the system comprises a scanner 1, a film driving circuit 105, a sub-scan driving circuit 104, a computer 2, an external communication circuit 107, and a RISC (reduced instruction set computer) 100. The scanner 1 includes an illuminating circuit 101 for illuminating film 130 by radiating a light beam from an illumination source, an optical system 102 for forming a film image corresponding to the film 130 illuminated by the illumination source of the illuminating circuit 130, and an imaging circuit 103 made of a charge accumulation type line sensor and adapted to detect the film image formed by the optical system 102. The film driving circuit 105 moves the film 130 set in the system. The sub-scan driving circuit 104 drives the illuminating circuit 101, the optical system 102 and the imaging circuit 103 in such a manner that these structural components are moved as one body. (The illuminating circuit 101, the optical system 102 and the imaging circuit 103 jointly constitute a sub-scan system, and this sub-scan system and the sub-scan driving circuit jointly constitute a scanning means.) The computer 2 is a general-purpose computer and comprises RAM 106 for temporarily storing information (incl. image information), a PC (personal computer) 151, a display 152, and an operation circuit 153. The operation circuit 153 is provided with a keyboard and a mouse which serve as a resolution setting means and a trimming setting means, respectively. By means of the computer 2, the user can send a command to the scanner 1 and confirm an image to be input. The external communication circuit 107 exchanges control signals and data (which includes image data) with the computer 2. The RISC 100 is connected to the illuminating circuit 101, the imaging circuit 103, the film driving circuit 105, the sub-scan driving circuit 104, the RAM 106 and the external communication circuit 107. The RISC 100 controls the scanner 1 and serves as both a charge accumulation control means and a scan control means.

According to this embodiment, an image is fetched by a scanning operation performed by mechanically driving the line sensor of the imaging circuit 103, the illuminating source of the illuminating circuit and the optical system 102 as one body. It should be noted that the film 130 is stored in a cartridge after the development process.

The film driving circuit 105 drives the film 130 to process a desired frame, in accordance with control signals supplied from the RISC 100. The sub-scan driving circuit 104 controls the sub-scan system (namely, the illuminating circuit 101, the optical system 102 and the imaging circuit 103) in accordance with control signals supplied from the RISC. An image recorded on the film 130 is illuminated by the illumination source of the illuminating circuit 101, and the light transmitted through the image is directed to the line sensor of the imaging circuit 103 by the optical system 102. By the line sensor, the light is subjected to integrating processing (charge accumulation), by which the light is converted into electric signals.

The RISC 100 stores temporary information (which includes image information) in the RAM 106, and exchanges data with the computer 2 (namely, the PC 151, display 152 and operation circuit 153) by way of the external communication circuit 153.

As described below, the RISC 100 associates the integration start time (i.e., the charge accumulation start time) of the line sensor of the imaging circuit 103 with the sub-scan execution time of the sub-scan driving circuit 104. In other words, the RISC 100 controls the driving start time of the sub-scan system and the integration start time of the line sensor such that they are substantially in synchronous with each other.

Figure 2:
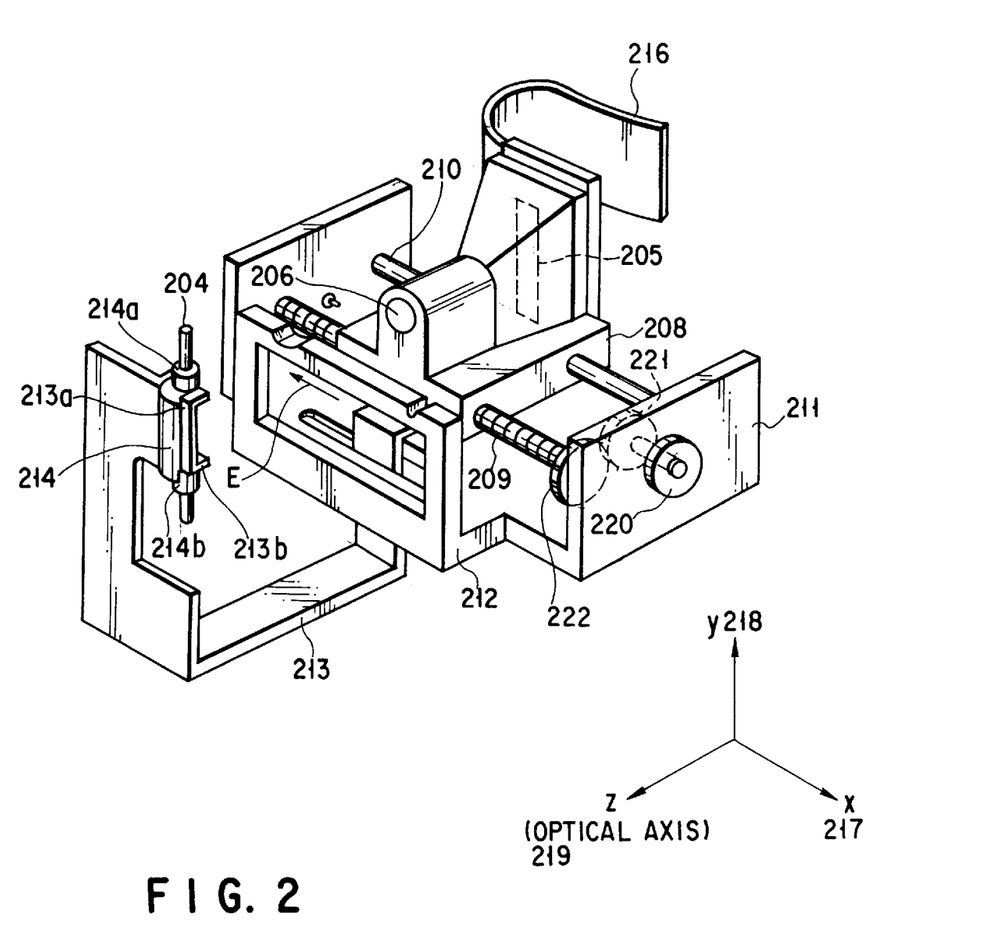
FIG. 2 shows a specific structure of an illumination circuit, an optical system, an imaging circuit and other peripheral sections of a scanner.

FIG. 2 shows a specific structure of the illumination circuit 101, optical system 102, imaging circuit 103 and other peripheral sections of the scanner 1. The structure shown in FIG. 2 comprises a rod-shaped lamp 204, a linear CCD image sensor (a charge accumulation type line sensor) 205, a lens 206, a control circuit board (which is not shown but connected to a cable 216), a carriage 208, a lead screw shaft 209, a guide shaft 210, a chassis 211, and an adapter mount section 212. The rod-shaped lamp 204 is made of a cold-cathode tube, for example, and serves as an illumination source for illuminating film. The lens 206 is an optical member for focusing an image recorded on the film on the linear CCD image sensor 205. On the control circuit board, the RISC 100 mentioned above is mounted. The RISC 100 includes a processing circuit for converting an output signal of the linear CCD image sensor 205 into a digital signal, a means for controlling the entire image input apparatus, etc. The carriage 208 serves as a holding means for holding the lens 206, the linear CCD image sensor 205, the circuit board, etc. The lead screw shaft 209 and the guide shaft 210 are parallel to each other and movably supporting the carriage. The chassis 211 supports the lead screw shaft 209 and the guide shaft 210. The chassis 211 and the adapter mount section 212 are integrally formed as one body.

The rod-shaped lamp 204 is located in the center of the front of the subject apparatus (it is depicted in the lower left portion of FIG. 2) and arranged with its longitudinal axis extending in the vertical direction. It is supported and held at one end of a substantially "L"-shaped lamp holding member 213. The lens 206 is arranged at a position that opposes the rod-shaped lamp 204, with the adapter mount section 212 located therebetween.

The lamp holding member 213 is secured to the carriage 208 at the other end. The lamp holding member 213 includes a horizontal portion that extends forward from the carriage 208 at a level lower than that of the adapter mount 212, and a vertical portion continuous to the horizontal portion. The vertical portion looks like the letter "C" when the front of the subject apparatus is looked at. The vertical portion is continuous to the horizontal portion at the lower end and holds the lamp 204 at the upper end. At the upper end, the vertical portion has a pair of projections 213a and 213b. Each of these portions 213a and 213b is provided with a V-shaped groove which is tapered toward the rear of the apparatus. A lamp fixing member 214 formed of silicone rubber or the like is arranged between the paired projections 213a and 213b. The lamp fixing member 214 has circular holes 214a and 214b at the respective ends. After the rod-shaped lamp 204 is inserted through these circular holes 214a and 214b, the lamp fixing member 214 is made to engage with the lamp holding member 213, and the rod-shaped lamp 204 is fitted in the V-shaped grooves of the projections 213a and 213b of the lamp holding member 213. In FIG. 2, reference numerals 217, 218 and 219 denote an "x"-axis, a "y"-axis and a "z"-axis (optical axis), respectively.

According to the present embodiment, a two-dimensional image is fetched by executing first and second scanning operations. The first scanning operation is a mechanical scan performed intermittently. The torque of the stepping motor (hereinafter referred to simply as an SP motor) 220 of the sub-scan driving circuit 104 is transmitted to transmission gear 221 provided on the output shaft of the SP motor 220. The torque is then transmitted to transmission gear 222 which is in mesh with transmission gear 221, thus rotating the lead screw shaft 209. By this rotation, the carriage 208 is driven in the direction indicated by "E", and the lamp 204, lens 206, the linear CCD image sensor 205 and the associated structural components are moved in the direction indicated by "E". The second scan is an electric scan performed by the linear CCD image sensor 205.

During the first scan, an adapter in which the film 130 is contained is immovably held on the adapter mount section 212 located between the lamp 204 of the illuminating circuit 101 and the lens 206 of the optical system 102. The film inside the adapter is driven by another motor (DC motor) contained in the film driving circuit 105, so that a desired frame of the film 130 is positioned.

Figure 3:
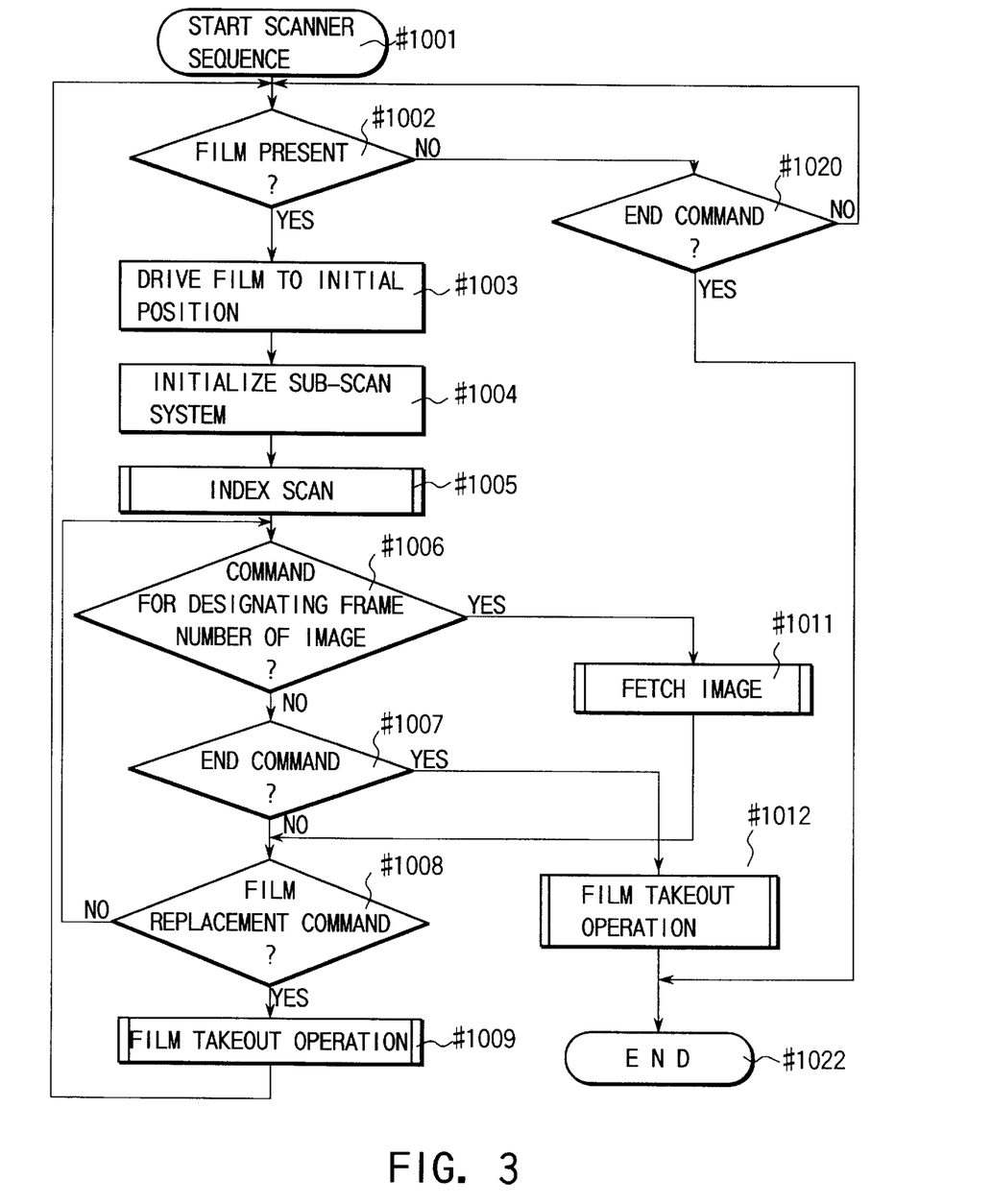
FIG. 3 is a flowchart illustrating the entire sequence of an image fetch operation.

FIG. 3 is a flowchart showing the entire sequence for image fetching. First of all, the scanner sequence is started (#1001). Next, a check is made to see whether or not there is film 130 to be processed (#1002). (If this check shows that there is film 130 to be processed, another check may be made to see whether that film 130 has been developed or not.) If there is no film (or if the film present is not developed), a determination is made to see whether an end command has been supplied from the computer 2 (#1021). If the end command supplied from the computer 2 is detected, the sequence is brought to an end (#1022). If it is not detected, the flow returns to step #1002.

When step #1002 shows that film is present (and that the film is in the developed state), the DC motor of the film driving circuit 105 is turned on (DCON: power supply is started). After the film 130 is driven to the initial position in step #1003 (normally, the first frame of the film is positioned), the DC motor is turned off (DCOFF: stop power supply). Subsequently, the SP motor is turned on (SPON: power supply is started). After the sub-scan system is initialized in step #1004 (i.e., it is moved to the initial position of the first frame), the SP motor is turned off (SPOFF: stop power supply). Then, an index scan is executed (#1005). By this index scan, the images recorded on the film are sequentially displayed on the display 152 with a predetermined low resolution. After the index scan, the system is set in the state waiting for a command to be issued by the computer 2. The command is one of the following three kinds: a command for designating the frame number of an image to be fetched; an end command; and a command for film replacement. If none of these three kinds of commands are not detected, the flow returns to step #1006. When a command for designating the frame number of an image is detected in step #1006, the image is fetched (#1011), and the flow advances to step #1008. When the end command is detected in step #1007, a film takeout operation, including the rewinding of film, is carried out (#1012), and then the flow is brought to an end (#1022). When a command for film replacement is detected (#1008), the film takeout operation, including the rewinding of film, is performed (#1009), and the flow returns to step #1002.

Figure 4:
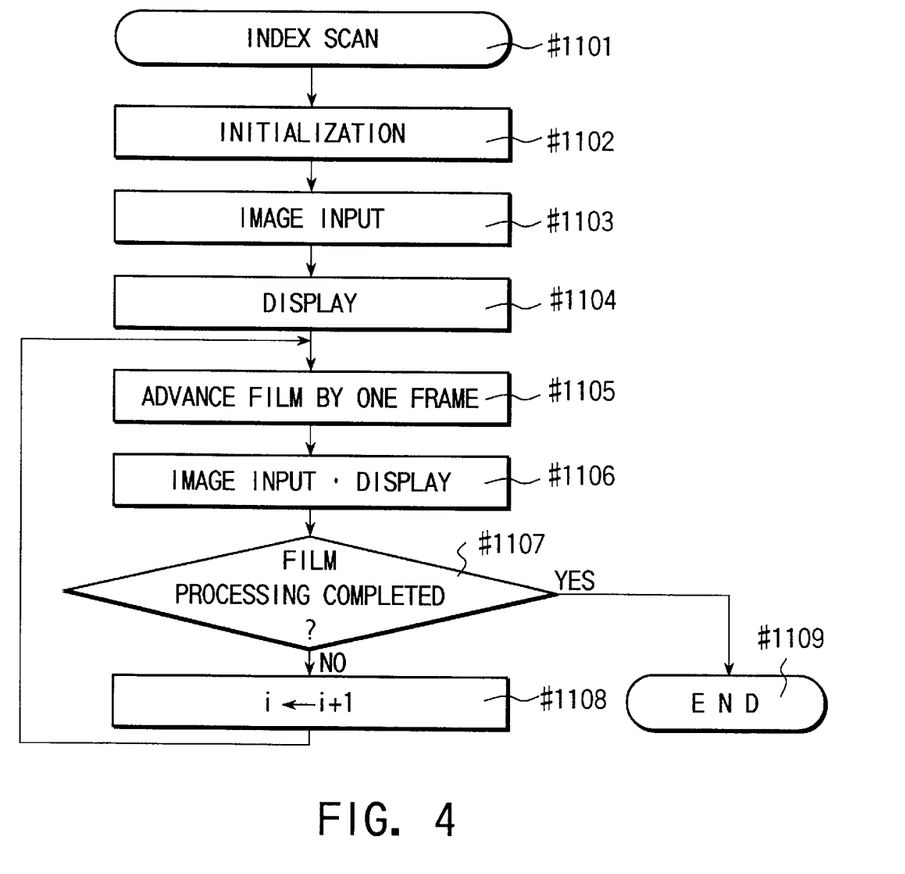
FIG. 4 is a flowchart showing the details of a sequence for an index scanning operation.

FIG. 4 is a flowchart showing the details of the sequence for index scan. Referring to FIG. 4, the sequence for the index scan is started (#1101). Then, an initializing operation is performed (#1102). This initializing operation includes: setting the variable of a film count to be 2 (i=2), setting the number of film frames to be read to be Ke, idly reading the line sensor, and switching on the illumination. Next, the SP motor is turned on, so that an image input operation is performed by sub-scan. Simultaneous with this, one of the frames is scanned with a predetermined resolution while simultaneously displaying the read images (#1103, #1104). Thereafter, the SP motor is turned off, and the DC motor is turned on. After the film 130 is advanced by one frame, the DC motor is turned off (#1105). Then, the SP motor is turned on again, so that an image input operation is performed by sub-scan. Simultaneous with this, one of the images is scanned with a predetermined resolution while simultaneously displaying the read images. Thereafter, the SP motor is turned off (#1106).

Thereafter, it is determined whether the processing for all frames of the film 130 has been completed (#1107). If the processing has not yet been completed (i.e., when i≠Ke), i is substituted for (i+1) (#1108), and the flow returns to step #1105. When the processing has been completed (i.e., when i=Ke), the illumination of the film 130 is switched off, thus bringing the sequence shown in FIG. 4 to an end (#1109).

Figure 5:
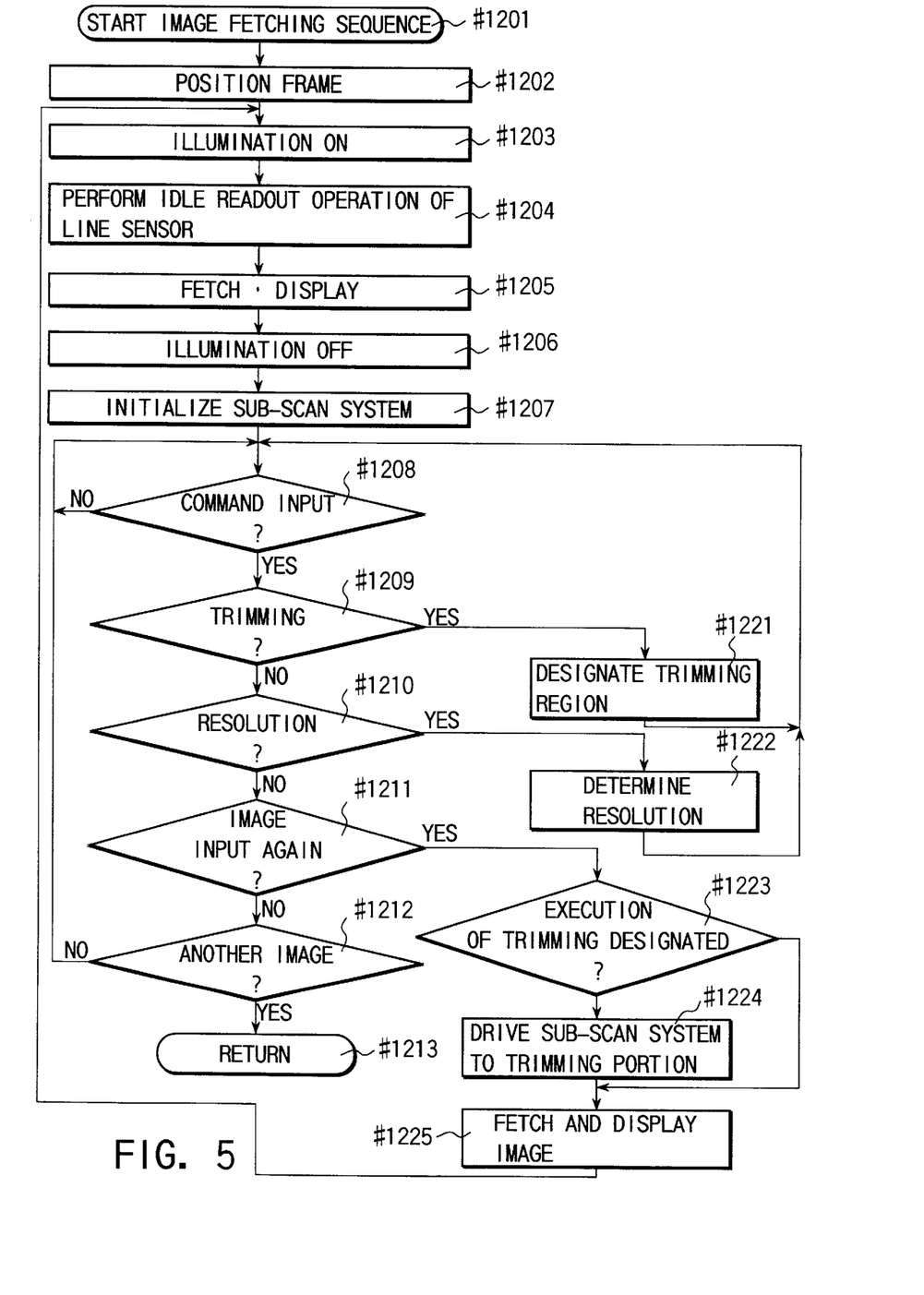
FIG. 5 is a flowchart showing the details of a sequence for an image fetch operation.

FIG. 5 is a flowchart showing the details of an image fetching sequence. According to the flowchart, a pre-scan is first performed, and then a substantial scan is performed. In the pre-scan, the images of all frames are fetched with a resolution higher than that with which the index scan is executed. In the substantial scan, a resolution and a trimming frame are determined, and images are fetched and displayed, accordingly.

Referring to FIG. 5, the image fetching sequence is started in step #1201. In the state where the DC motor is ON, a predetermined frame of the film 130 is positioned. The DC motor is turned off at the end of the positioning (#1202). At the time of positioning, the film 130 is wound and rewound, and it is preferable that the forward movement and the backward movement be performed by use of different methods. To be more specific, when the film is rewound, it is preferable that the tape be pulled in the direction opposite to that in which it is moved. Subsequently, the illumination is turned on (#1203), and the line sensor is reset to perform an idle readout operation (#1204). In the state where the SP motor is ON, the pre-scan of all images is performed, and the images are displayed in the order in which they are fetched. The SP motor is turned off (#1205) at the end of the fetching operation. Next, the illumination is turned off (#1206).

In the state where the SP motor is ON, the sub-scan system is initialized (#1207). That is, it is driven to the initial position. Thereafter, the SP motor is turned off. Accordingly, the system is set in the state waiting for a command to be issued by the computer 2 (#1208). The command is one of the following four kinds: a command for trimming setting, a command for resolution setting, a command for inputting an image again, and a command for inputting another image.

When the execution of trimming is designated, the trimming region is designated on the pre-scan screen (i.e., a trimming frame is displayed on the trimming image screen) in step #1221. The trimming coordinates are calculated on the basis of the information representing how the SP motor should be driven for the trimming of an image. After the information on the position to which the SP should be moved is recorded, the flow returns to step #1208. When the determination of a resolution is designated, the resolution at which an image is fetched is determined (#1222), and the flow returns to step #1208. If no resolution is determined, the initial resolution is used.

If an image is input again, a check is made to see whether the execution of trimming is designated (#1223). If the execution of trimming is not designated, the flow advances to step #1225. When the execution of trimming is designated, the SP motor is kept in the ON state, and the sub-scan system is driven to the trimming position (#1224). Subsequently, the line sensor is reset, and an idle readout operation is performed. The illumination is turned on for a sub-scan operation, and simultaneously an integrating operation is performed for fetching and displaying an image (#1225). After the end of the image fetching operation, the SP motor and the illumination are turned off, and the flow returns to step #1203.

In step #1212, a check is made to see whether another image (frame) is designated. If this is the case, the present sequence is brought to an end (#1213). If not, the flow returns to step #1208.

Figure 6:
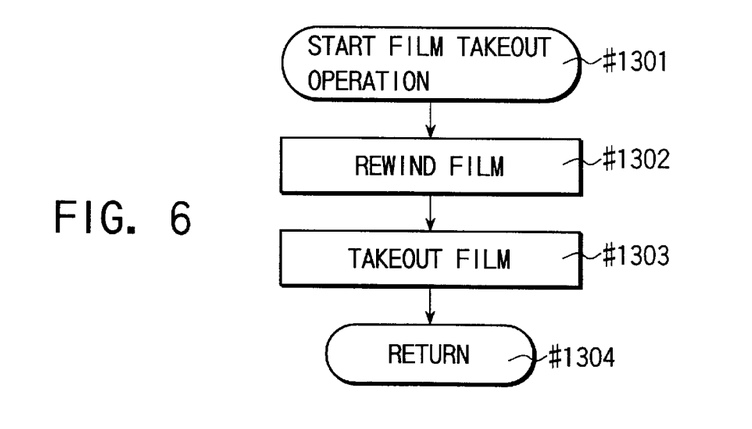
FIG. 6 is a flowchart showing the details of a sequence for a film takeout operation.

FIG. 6 is a flowchart showing the details of a sequence for a film takeout operation.

First of all, the film takeout operation is started in step #1301. Subsequently, the film is rewound, with the DC motor kept ON. After this, the DC motor is turned off (#1302). After the film 130 is taken out (#1303), the present sequence is brought to an end (#1304).

As can be seen from FIGS. 4 and 5, according to the present embodiment, the line sensor is reset (i.e., the charge accumulated therein is discharged) at the initial period of time determined for image fetching. Accordingly, the present embodiment is advantageous to a case where a CCD or another charge transfer type device is used as a line sensor.

As is apparent from the sequences shown in FIGS. 3–6, according to the present embodiment, different motors are not driven at one time. This is effective in preventing a heavy load from being applied to the power supply. For example, power is not simultaneously supplied to both the DC motor and the SP motor or the lamp.

FIGS. 7A–7F illustrate a method which is used for driving an SP motor when a sub-scan operation for fetching an image (#1205, #1225) is being executed. The SP motor employed in the embodiment is driven on the basis of the four-phase pulse signal (C1, C2, C3, C4) shown in FIGS. 7A–7D. The four-phase pulse signal is supplied from the RISC 100 to the sub-scan driving circuit 104. In FIGS. 7A–7D, the abscissa represents time, and the ordinate represents the level of a pulse.

Figure 7A:
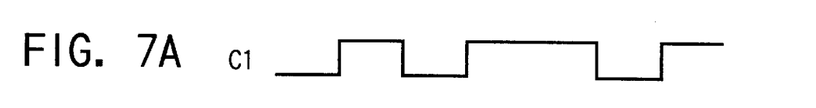
FIGS. 7A–7F illustrate a method which is used for driving a stepping motor when a sub-scan operation for fetching an image is being executed.
Figure 7B:
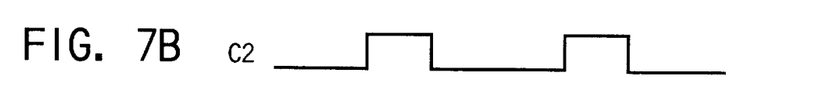
Figure 7C:
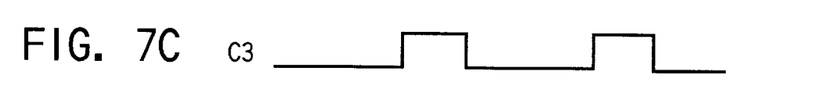
Figure 7D:
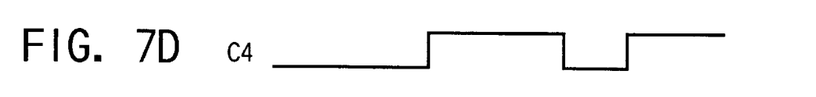
Figure 7E:
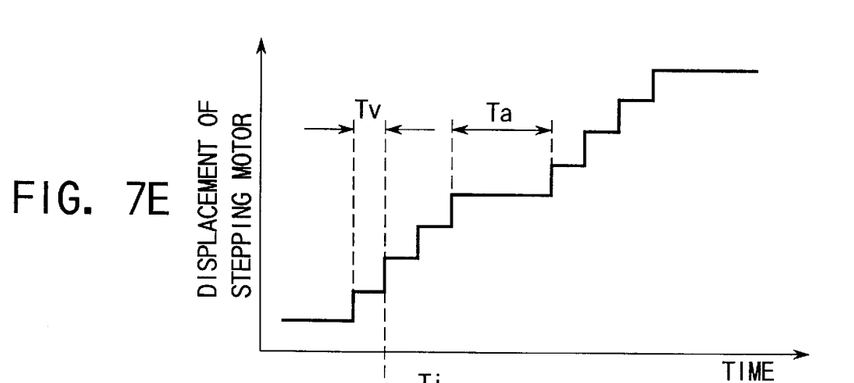

FIG. 7E shows how the SP motor is driven or displaced when the clock shown in FIGS. 7A–7D is supplied thereto.

Figure 7F:
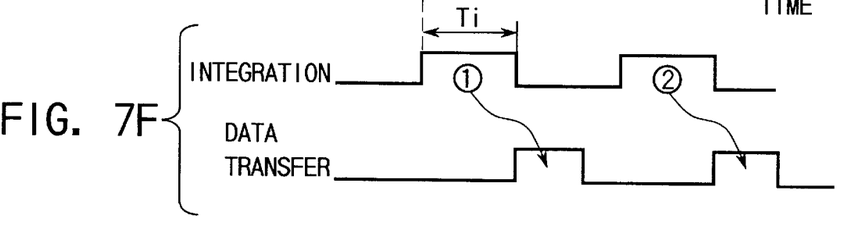

FIG. 7F shows the relationship between the integration start time of the line sensor and the data transfer time at which readout data is transferred to the PC 151 by way of the external communication circuit 107. In FIGS. 7E and 7F, Tv denotes time intervals at which the SP motor is driven, Ta denotes a period of time during which the SP motor is kept stationary (Ta is longer than Tv), and Ti denotes a charge accumulation period.

In the present embodiment, the integration start time of the line sensor is synchronized with the time at which the SP motor is driven for sub-scanning. To be more specific, the integrating operation is performed with respect to the line sensor when the SP motor is being driven, and the operation for reading out the data obtained by the integration, the A/D conversion, and the data transfer to the PC 151 are performed during the period of time Ta, i.e., when the SP motor is kept stationary. Accordingly, an image can be fetched with high efficiency even if this fetching operation is the second-time fetching operation.

Figure 8A:
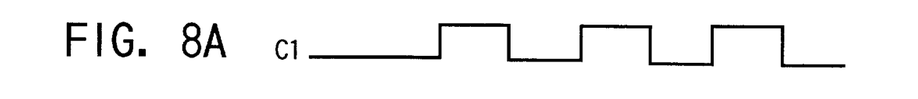
FIGS. 8A–8F illustrate a modified method used for driving the stepping motor during the image fetching operation.
Figure 8B:
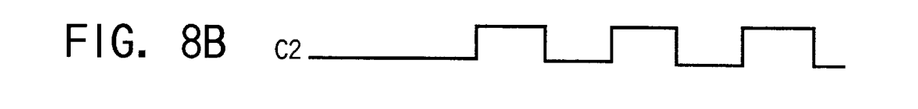
Figure 8C:
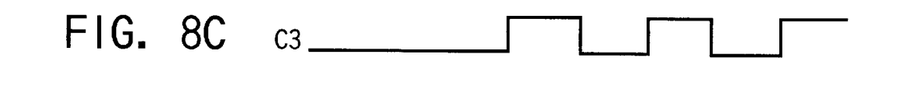
Figure 8D:
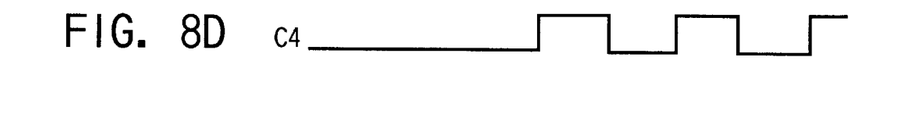
Figures 8E, 8F:
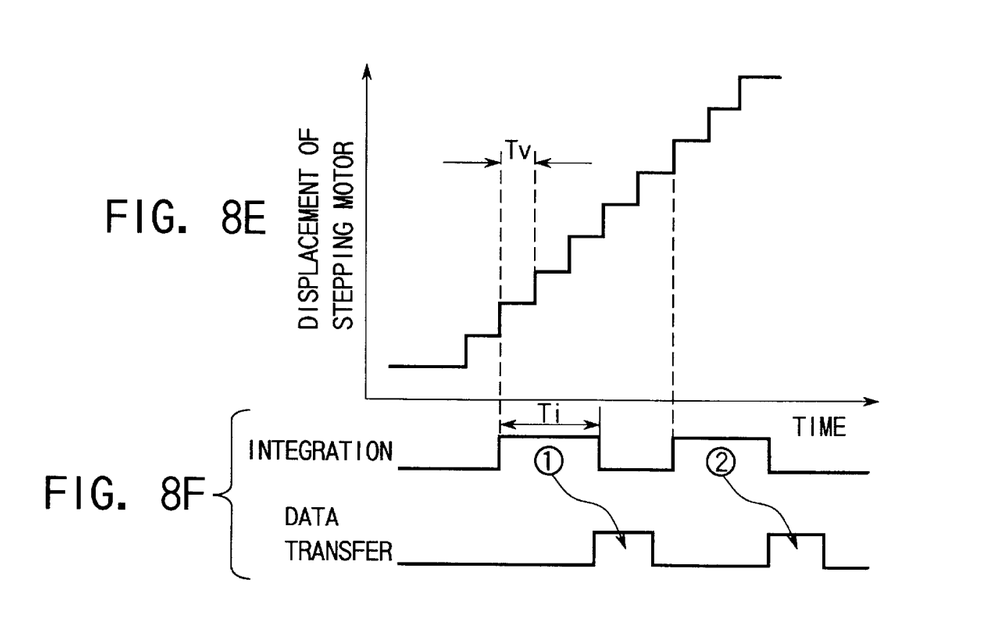

FIGS. 8A–8F illustrate a modified method used for driving the SP motor. The SP motor employed in this modified method is driven on the basis of the driving pulse shown in FIGS. 8A–8D. FIG. 8E shows the manner in which the SP motor is driven or displaced by the driving pulse. FIG. 8F shows the relationships between the integration start time of the line sensor and the data transfer time at which readout data is transferred to the PC 151 by way of the external communication circuit 107.

In the modified method, there is no time corresponding to period of time Ta (i.e., the period of time during which the SP motor is kept stationary). In other words, the integrating operation for the line sensor, the operation for reading out the data obtained thereby, the A/D conversion, and the data transfer to the PC 151 are executed while simultaneously driving the SP motor at constant speed. Hence, an image can be fetched at high speed.

Figure 9A:
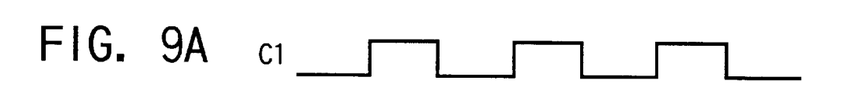
FIGS. 9A–9F illustrate another modified method used for driving the stepping motor during the image fetching operation.
Figure 9B:
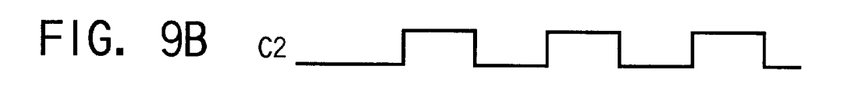
Figure 9C:
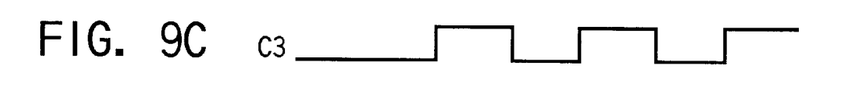
Figure 9D:
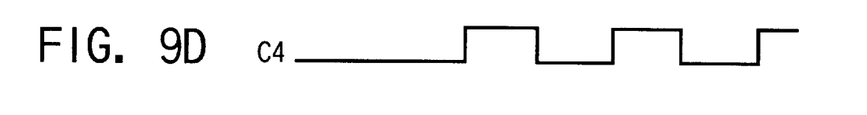
Figure 9E:
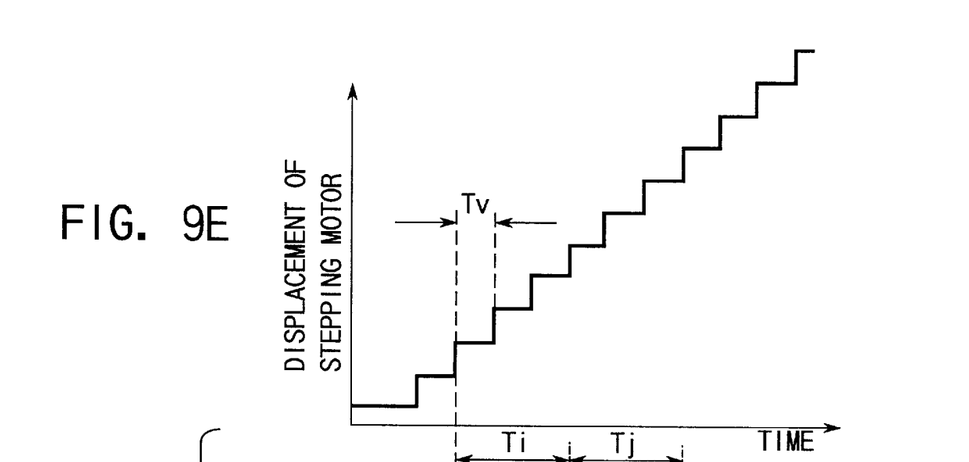
Figure 9F:
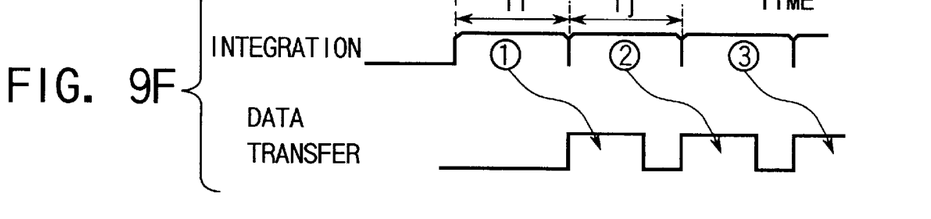

FIGS. 9A–9F illustrate another modified method used for driving the SP motor. The SP motor employed in this modified method is driven on the basis of the driving pulse shown in FIGS. 9A–9D. FIG. 9E shows the manner in which the SP motor is driven or displaced by the driving pulse shown in FIGS. 9A–9D. FIG. 9F shows the relationships between the integration start time of the line sensor and the data transfer time at which readout data is transferred to the PC 151 by way of the external communication circuit 107.

In the method shown in FIGS. 9A–9F, the integrating operation for the line sensor is performed in the integration period (charge accumulation period) Ti while simultaneously driving the SP motor at constant speed, as in the method shown in FIGS. 8A–8F. In the next integration period (charge accumulation period) Tj, the data obtained by the integrating operation performed last is read out, and the A/D conversion and the data transfer to the PC 151 are performed. Accordingly, an image can be fetched with high accuracy and at high speed.

By synchronizing the integration start time with the sub-scan execution time, as shown in FIGS. 7A–7F, 8A–8F and 9A–9F, integration data can be obtained exactly from the intended position at all times, and an image with high quality can be easily obtained with high positional accuracy. Even if the same image is repeatedly read, it can be fetched with satisfactory reproducibility. In particular, when a command for executing trimming is issued, the image portion requiring the trimming can be positioned with high accuracy. In this manner, the trimming image with high reproducibility can be fetched.

FIGS. 10A–10E illustrate relationships between the resolution of a fetched image and the driving speed of the SP motor.

Figure 10A:
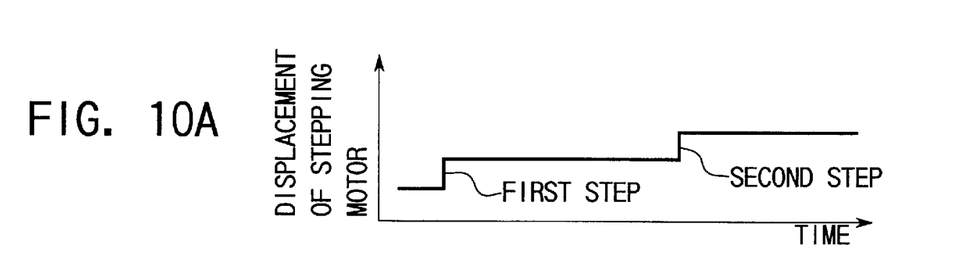
FIGS. 10A–10E illustrate relationships between the resolution of a fetched image and the driving speed of the stepping motor.
Figure 10B:
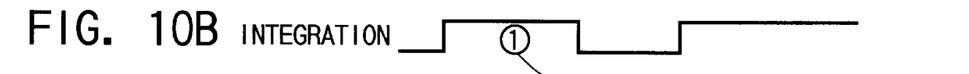
Figure 10C:
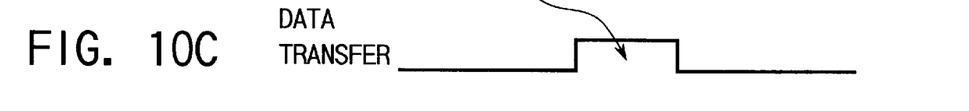
Figure 10D:
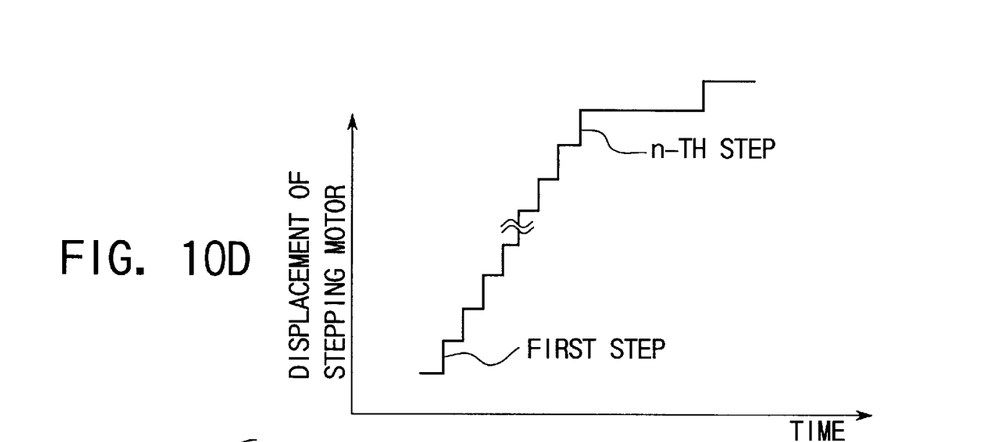
Figure 10E:
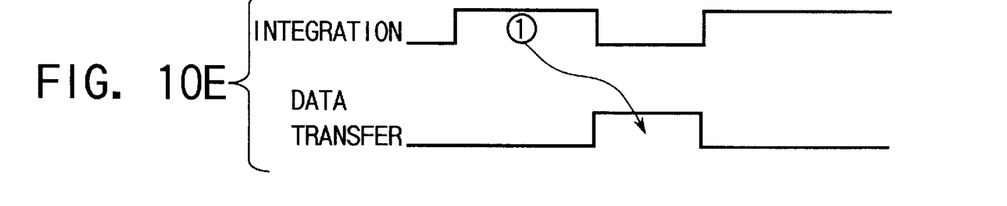

A description will be given as to how the driving speed of the SP motor is related to the integrating operation performed for the line sensor. When a maximal resolution is designated, the integrating operation is started in synchronism with a sub-scan driving pulse, as in the case shown in FIGS. 7A–7F. After the integrating operation and the data transfer operation, the next sub-scan and integrating operations are performed. At the time, the integrating and data transfer operations are executed when the SP motor has been driven by the first one step, as shown in FIGS. 10A to 10C. Then, the SP motor is driven by the next one step. When a low resolution is designated, an integrating operation is performed while simultaneously driving the SP motor a number of times (the first one step to the n-th one step). To be more specific, during the integration period, the SP motor is moved by the number of times predetermined in accordance with the resolution, so as to increase the feeding speed. Since, in this manner, the sub-scan speed can be varied in accordance with the resolution, an image of high quality can be fetched. In the operation for reading an image, there is no difference in quality between the image portion read in the initial stage and the image portion read in the final stage. In addition, even if that image is fetched a number of times, it can be read with high reproducibility.

According to the present invention, the sub-scan operation is executed by driving the illumination lamp, the optical system and the line sensor. Needless to say, however, this in no way restricts the present invention. For example, the sub-scan operation may be executed by driving only the sensor or by driving both the sensor and the optical system. In addition, it may be executed by moving the film stepwise.

In the above embodiment, the speed of a sub-scan operation is controlled in accordance with resolution information. Instead of this speed control, the brightness of the illumination system may be controlled. For example, when the resolution is low, the brightness of the illumination system may be lowered and the integration period may be lengthened, with the same scan speed maintained. In this manner, a desired region can be scanned within the integration period.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image input apparatus comprising:
   imaging means, including a charge accumulation type line sensor, for converting an image recorded on a film into an electric signal in a main scanning operation;
   scanning means, including a stepping motor, for mechanically sub-scanning a relative positional relationship between the film and the line sensor in a direction parallel to the film, and for repeating a subset of sub-scanning operations in an intermittent fashion; and
   control means for starting charge accumulation of the line sensor in synchronism with a time at which said scanning means starts said subset of sub-scanning operations, and for reading and transferring the electric signal produced by said imaging means in synchronism with a time at which said subset of sub-scanning operation ends and said scanning means is at rest.

2. An image input apparatus according to claim 1, wherein said control means stops the charge accumulation of the line sensor in synchronism with the time at which said subset of sub-scanning operations ends.

3. An image input apparatus comprising:
   an imaging mechanism, including a line sensor, for converting a film image into a digital image;
   an imaging control mechanism for controlling an integration start time of the line sensor;
   a scanning mechanism, including a stepping motor driven by pulse signals, for mechanically scanning the film and the imaging mechanism relative to each other in a direction parallel to the film;
   a scan control mechanism for controlling the scanning mechanism based on the pulse signals; and
   a resolution determining mechanism for determining a resolution of the image to be converted by the imaging mechanism,
   wherein said scan control mechanism varies a number of the pulse signals generated per unit time, in accordance with information relating to the resolution determining mechanism; and
   wherein said imaging control mechanism initiates charge accumulation of the line sensor in synchronism with a time at which said scanning mechanism starts a scanning operation.

* * * * *